Jan. 3, 1950      S. S. MEISLER      2,493,156
DUST COLLECTOR
Filed Feb. 21, 1947
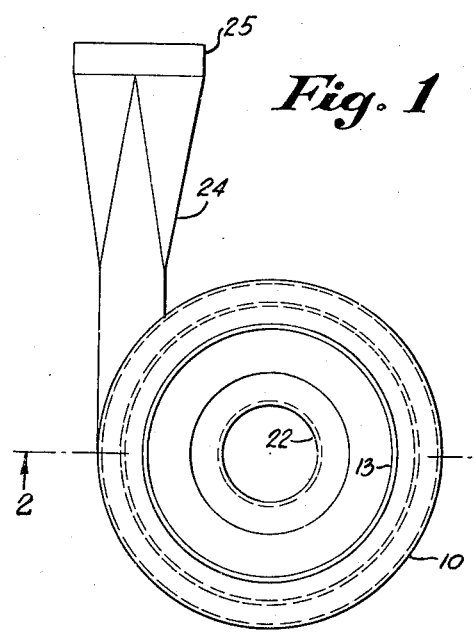
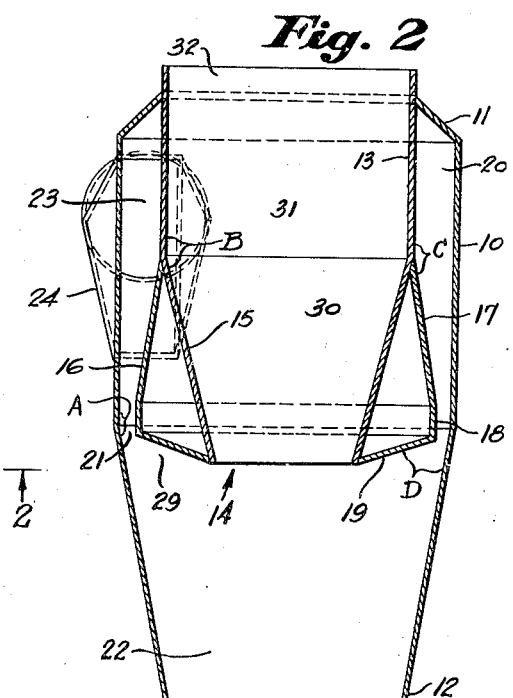
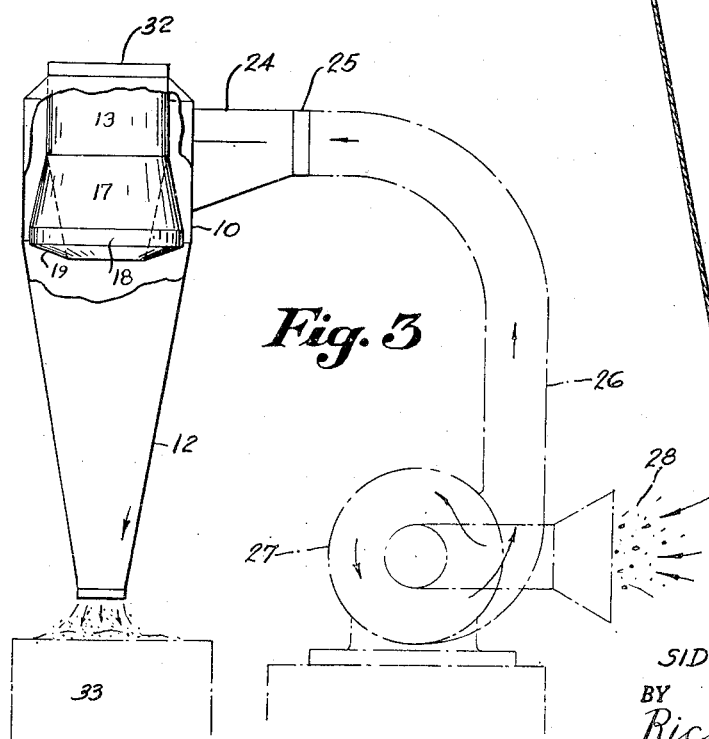
INVENTOR.
SIDNEY S. MEISLER
BY
Richards & Geier
ATTORNEYS Patented Jan. 3, 1950

2,493,156

UNITED STATES PATENT OFFICE 2,493,156

DUST COLLECTOR

Sidney S. Meisler, New York, N. Y.

Application February 21, 1947, Serial No. 730,007

2 Claims. (Cl. 183—89)

This invention relates to dust collectors and more particularly to dust collectors wherein air having dust particles entrained therein is lead into the collector at relatively high speed for the purpose of depositing the entrained dust therein and is ultimately lead out of said collector substantially free of dust.

One object of this invention is the provision of such a dust collector of greatly reduced overall dimensions capable of delivering air therefrom from which dust has been removed to an extent not heretofore attained.

Another object is the provision of such a dust collector having a simplified structure and which will entrap a greater variety of dust particles.

A still further object of this invention is the provision of such a device which may be manufactured at a cost considerably smaller than heretofore possible.

Heretofore, in collectors which I have known, the rate of speed at which the air moved in collectors of this type has been alternately increased and decreased. Thus, another object of this invention is the provision of a collector which maintains, then rapidly increases the rate of speed of the air in the device and finally provides for a great and rapid decrease in said speed in order to attain practically total separation of the entrained dust particles from said air.

Yet another object is the provision of such a device wherein the various parts have been disposed in such an angular relationship that maximum efficiency is attained for all proportional variations in the dimensions of the collector without any variation in said angular relationship.

Other objects and novel features will appear as the nature of the invention is better understood, the invention consisting in the novel arrangement and corelation of parts herein fully described, and illustrated in the accompanying drawings, wherein similar reference characters are used to denote corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure and the latter, therefore, is to be understood from an illustrative, rather than a restrictive standpoint.

In carrying out an embodiment of the invention, it was found advantageous to provide a cylindrical housing with an inverted truncated cone shaped member depending therefrom. Suspended within said housing and concentric therewith a cylindrical body, substantially narrower than said housing is open at its upper end and has depending from its lower edge a double walled member the walls of which converge at the point of juncture with said cylindrical body. The housing together with the members suspended therein form an annular chamber which is considerably constricted along its lower end where it opens into the base of the inverted cone shaped member. A duct opening into said annular chamber and tangentially disposed with respect to the same serves as the means through which air is introduced thereto; while any type pumping means such as a turbine connected to the duct and to a source of dust laden air supplies a stream of air as desired.

In the drawings:

Figure 1 is a top plan view of the device constructed in accordance with this invention with inner structure shown in broken lines;

Figure 2 is a vertical section on line 2—2 of Figure 1; and

Figure 3 is a side elevation thereof with the housing partially broken away so as to uncover the inner structure and with a turbine and dust receptacle shown in dot and dash lines.

Referring now to the drawings in detail, a cylindrical housing 10, having an annular flange 11 at its upper end, has depending from its lower edge a funnel or inverted truncated cone shaped member 12 the base of which is equivalent to and co-extensive with the base of said housing. Suspended in said housing 10 and connected to flange 11, a cylindrical body 13, substantially narrower than and concentric with the housing has an air outlet opening 32 at its upper end and has depending from its lower edge a double walled member 14 the walls of which converge at the juncture of said double walled member 14 with said cylindrical body 13.

The inner wall 15 of member 14 is also in the shape of a funnel or inverted truncated cone, while the outer wall 16 substantially shorter than the inner wall has a cone shaped portion 17 which merges into a narrow cylindrical portion 18. A band 19 connects the ends of walls 15 and 16, sealing the space therebetween.

Cylindrical body 13 and outer wall 16 together with housing 10 form an annular chamber 20, the cross sectional area of which is restricted by portion 17 of wall 16. Cylindrical portion 18 of wall 16 projects below housing 10 into the funnel or dust collector 12 forming a constricted opening 21 therewith through which annular chamber 20 opens into a collection chamber 22 formed by funnel or collector 12.

A rectangular inlet opening 23 formed in housing 10 has a neck 24 tangentially disposed with respect to housing 10 for admitting the dust laden air into chamber 20. The walls of neck 24 merge into a circular collar 25 to which the usual circular air duct 26 may be connected. Duct 26 may also be connected to an air turbine 27 or the like for supplying a stream of dust laden air 28 from grinding wheels, buffing and polishing wheels, wood saws and the like (not shown herein) to chamber 20.

Annular chamber 20 opens through opening 21 into an expansion chamber 29, formed by the sides of collector 22 and band 19, which in turn opens into a second expansion chamber 30 formed by the inner wall 15 of member 14 and which finally opens into outlet chamber 31 formed by cylindrical body 13. The outlet chamber 31 has an outlet opening 32.

The angular disposition of the various surfaces, hereinafter more particularly described, is such that when a stream of dust laden air, travelling at a predetermined rate of speed passes into and around through chamber 20, said rate of speed is increased approximately three times so that a cyclonic aerodynamic reaction occurs in expansion chamber 29 which separates the entrained dust from the air, permitting the dust to settle downwardly along the surface of collector 12 into a receptacle 33.

In operation, a stream of dust laden air passes through the turbine 27 and duct 26, entering neck 24 through collar 25 travelling between 3,000 and 4,000 feet per minute.

In neck 24 the air stream is spread so as to be rectangular in cross section and to more nearly approximate the height of chamber 20 without any loss in speed since no expansion of the stream of air is permitted in as much as the cross sectional area of neck 24 throughout its length is substantially the same as the cross sectional area of duct 26. The air stream on entering chamber 20 whirls downwardly through the same toward opening 21, its speed of travel increasing and attaining in this particular illustration a rate of approximately 10,000 feet per minute. As the rate of speed is increased substantially all the dust particles carried by the air are driven outwardly by centrifugal force until they are whirling around chamber 20 adjacent the surface of housing 10. When this stream of air travelling at high speed with the dust particles entrained at its periphery passes through opening 21, it expands instantaneously and thereby undergoes a sudden decrease in speed. As the stream enters the second expansion chamber 30 there has been a 25% reduction in the rate of speed at which the air stream originally entered chamber 20. The dust particles being against the surface of the housing and then against the surface of collector 12 by reason of centrifugal force, continue travelling the surface of collector 12 because of inertia when the aforesaid drop in speed of the air stream takes place, and settle downwardly through a dust outlet opening 34 formed in the lower end thereof into receptacle 33.

Tests have shown that portions of the air stream travel downwardly in the collector 12 approximately ⅓ the length thereof and no more. The air stream passes up through chambers 30 and 31 and when leaving through outlet 32 has undergone a 75% reduction in speed or leaves travelling at approximately 1,000 feet per minute or less if as in the given situation the speed at the inlet was 3,000 to 4,000 feet per minute.

Experimentation and tests disclosed that the angular disposition of the three cones 15, 17 and 12 and band 19 with respect to housing 10 or cylinder 13 determined the efficiency of the device and that maximum efficiency was attained only from a small range of angular values. It was also found that the critical range lay within one degree of the following values and that a departure therefrom resulted in material loss of efficiency. The angle between housing 10 and collector 12, angle A of Figure 2 was found to be 170 degrees; that between inner wall 15 and cylinder 13 angle B, 165 degrees; that between outer wall 16 and cylinder 13, angle C, 170 degrees; and that between band 19 extended and collector 12, angle D, 60 degrees.

By maintaining these angles constant the dimensions of the various portions of the device may be increased or decreased proportionally in order to increase or decrease the capacity of the device without any loss in efficiency. Thus, the various lengths and diameters of the several portions of the device may be conveniently expressed as functions of any one of said portions, such as the internal diameter of intake collar 25.

From the foregoing it will be seen that the present invention provides a highly efficient, yet easily constructed dust collector which, because of its reduced size, may be readily used in close proximity to the source of dust.

It is apparent that the illustrations shown above have been given solely by way of illustration and not by way of limitation and that the above examples are subject to variations and modifications within the scope of the appended claims. All such variations and modifications are to be included within the scope of the present invention.

What is claimed is:

1. A dust collector comprising a cylindrical housing, an inverted truncated cone shaped collector at the lower end of said housing, a cylindrical body suspended in said housing having an axial air outlet opening at its upper end, an inner inverted truncated cone shaped wall connected to the lower end of said cylindrical body and opening into said inverted cone shaped collector, an outer truncated cone shaped wall converging with said inner wall at the upper end thereof and having a cylindrically shaped lower end, an annular band sealingly connecting the lower ends of said walls, said cylindrical body and said outer cone-shaped wall being spaced from said housing to form an annular chamber having decreasing cross-sectional area toward the lower end thereof, and an inlet neck connected to said housing and arranged to discharge dust laden air circumferentially of said annular chamber, said inverted cone shaped collector and said band forming an expansion chamber communicating with said annular chamber, said inner wall forming a second expansion chamber communicating with said first mentioned expansion chamber and said air outlet.

2. A dust collector as described in claim 1 wherein said housing and said inverted cone shaped collector form an internal angle ranging between 169 to 171 degrees, wherein said cylindrical body and said inner inverted cone shaped wall form an internal angle ranging between 164 to 166 degrees, wherein said cylindrical body and said outer cone shaped wall form an external angle ranging between 169 to 171 degrees, and wherein said annular band is disposed at an angle ranging between 59 to 61 degrees with respect to said inverted cone shaped collector.

SIDNEY S. MEISLER.

REFERENCES CITED

The following references are of record in the file of this patent:

UNITED STATES PATENTS

| Number | Name | Date |
|---|---|---|
| 969,769 | Brassert et al. | Sept. 13, 1910 |
| 989,939 | Allington | Apr. 18, 1911 |
| 1,316,988 | Wegner | Sept. 23, 1919 |